(12) United States Patent
Ju

(10) Patent No.: US 11,316,151 B2
(45) Date of Patent: Apr. 26, 2022

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventor: Seo Hee Ju, Daejeon (KR)

(73) Assignee: LG Chem, Ltd.

( * ) Notice: Subject to any disclaimer, the term of this patent is extended or adjusted under 35 U.S.C. 154(b) by 353 days.

(21) Appl. No.: 16/627,098

(22) PCT Filed: Oct. 19, 2018

(86) PCT No.: PCT/KR2018/012447
§ 371 (c)(1),
(2) Date: Dec. 27, 2019

(87) PCT Pub. No.: WO2019/078685
PCT Pub. Date: Apr. 25, 2019

(65) Prior Publication Data
US 2020/0168903 A1    May 28, 2020

(30) Foreign Application Priority Data
Oct. 20, 2017 (KR) .................. 10-2017-0136890

(51) Int. Cl.
*H01M 4/36* (2006.01)
*H01M 4/04* (2006.01)
(Continued)

(52) U.S. Cl.
CPC ........... *H01M 4/366* (2013.01); *C01B 25/301* (2013.01); *C01B 35/121* (2013.01); *C01G 53/50* (2013.01);
(Continued)

(58) Field of Classification Search
CPC ....... H01M 10/0525; H01M 2004/028; H01M 4/0402; H01M 4/0471; H01M 4/366; H01M 4/525; H01M 4/62
See application file for complete search history.

(56) References Cited

U.S. PATENT DOCUMENTS

2007/0298324 A1    12/2007    Kawasato et al.
2013/0175469 A1    7/2013    Paulsen et al.
(Continued)

FOREIGN PATENT DOCUMENTS

CN    102779991 A    11/2012
CN    104011925 A    8/2014
(Continued)

OTHER PUBLICATIONS

International Search Report from PCT/KR2018/012447 dated Apr. 11, 2019, 5 pages.

*Primary Examiner* — Carlos Barcena
(74) *Attorney, Agent, or Firm* — Lerner, David, Littenberg, Krumholz & Mentlik, LLP

(57) ABSTRACT

A positive electrode active material including a nickel-containing lithium transition metal oxide containing nickel in an amount of 60 mol % or more based on a total number of moles of transition metals excluding lithium, and a coating layer which is formed on a surface of the nickel-containing lithium transition metal oxide and includes a lithium-containing inorganic compound, a nickel oxide, and a nickel oxyhydroxide is provided. A method of preparing the positive electrode active material, and a positive elec- (Continued)

trode for a lithium secondary battery and a lithium secondary battery which include the positive electrode active material are also provided.

16 Claims, 4 Drawing Sheets

(51) Int. Cl.
 H01M 4/525      (2010.01)
 H01M 4/62       (2006.01)
 H01M 10/0525    (2010.01)
 C01B 25/30      (2006.01)
 C01B 35/12      (2006.01)
 C01G 53/00      (2006.01)
 H01M 4/02       (2006.01)

(52) U.S. Cl.
 CPC ....... *H01M 4/0402* (2013.01); *H01M 4/0471* (2013.01); *H01M 4/525* (2013.01); *H01M 4/62* (2013.01); *H01M 10/0525* (2013.01); *C01P 2002/74* (2013.01); *C01P 2004/04* (2013.01); *C01P 2006/40* (2013.01); *H01M 2004/028* (2013.01)

(56) References Cited

U.S. PATENT DOCUMENTS

| | | |
|---|---|---|
| 2013/0277604 A1 | 10/2013 | Shimokita et al. |
| 2013/0316221 A1 | 11/2013 | Lee et al. |
| 2014/0212758 A1 | 7/2014 | Kawasato et al. |
| 2016/0013476 A1 | 1/2016 | Oh et al. |
| 2016/0172663 A1 | 6/2016 | Saka et al. |
| 2017/0187065 A1 | 6/2017 | Inoue et al. |

FOREIGN PATENT DOCUMENTS

| | | |
|---|---|---|
| EP | 2654109 A1 | 10/2013 |
| JP | 2000100433 A | 4/2000 |
| JP | 2006302880 A | 11/2006 |
| JP | 2007213866 A | 8/2007 |
| JP | 2010040382 A | 2/2010 |
| JP | 2010055777 A | 3/2010 |
| JP | 5079247 B2 | 11/2012 |
| JP | 2013137947 A | 7/2013 |
| JP | 2013541129 A | 11/2013 |
| JP | WO2013047877 A1 | 3/2015 |
| JP | 2015225741 A | 12/2015 |
| JP | 6128396 B2 | 5/2017 |
| KR | 20070103023 A | 10/2007 |
| KR | 20130108717 A | 10/2013 |
| KR | 20130117340 A | 10/2013 |
| KR | 20150050458 A | 5/2015 |
| KR | 20160118081 A | 10/2016 |
| KR | 20170063383 A | 6/2017 | ns of the present invention. It should be further understood that the terms "comprises," "comprising," "includes," "including," "has," "have," "having," or any other variation thereof, used herein, are intended to cover a non-exclusive inclusion, such that a process, method, article, or apparatus that comprises a list of steps or elements is not necessarily limited to only those steps or elements but may include other steps or elements not expressly listed or inherent to such process, method, article, or apparatus.

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

TECHNICAL FIELD

Cross-Reference to Related Applications

The present application is a national stage entry under 35 U.S.C. § 371 of PCT/KR2018/012447 filed on Oct. 19, 2018, which claims priority to Korean Patent Application No. 10-2017-0136890, filed on Oct. 20, 2017, in the Korean Intellectual Property Office, the disclosures of which are incorporated herein in their entirety by reference.

TECHNICAL FIELD

The present invention relates to a positive electrode active material for a lithium secondary battery, a method of preparing the positive electrode active material, and a positive electrode for a lithium secondary battery and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium nickel cobalt metal oxide, in which a portion of nickel (Ni) is substituted with cobalt (Co), manganese (Mn), or aluminum (Al), has been developed.

However, with respect to the lithium nickel cobalt metal oxide, there is a limitation in that safety and life characteristics of the battery are rapidly degraded by an increase in interfacial resistance between an electrolyte and an electrode including an active material as charge and discharge are repeated, electrolyte decomposition due to moisture in the battery or other influences, degradation of a surface structure of the active material, and an exothermic reaction accompanied by rapid structural collapse, and such limitation is particularly more severe under high-temperature and high-voltage conditions.

In order to address such limitation, methods of not only improving structural stability of the active material itself by doping the lithium nickel cobalt metal oxide and improving surface stability by coating a surface of the lithium nickel cobalt metal oxide, but also increasing stability of an interface between the electrolyte and the active material have been proposed. Typically, a method of forming a coating layer on a surface by using a dry coating method during the synthesis of a positive electrode active material has been conducted. However, in this case, since it is not easy to uniformly form the coating layer on the surface, it is not fully satisfactory in terms of its effect and process.

Thus, there is a need to develop a positive electrode active material which includes a lithium nickel cobalt metal oxide, wherein resistance may be reduced by forming a uniform coating layer on the surface of the lithium nickel cobalt metal oxide and a battery having improved stability and life characteristics may be prepared.

DISCLOSURE OF THE INVENTION

Technical Problem

An aspect of the present invention provides a positive electrode active material in which life characteristics are improved by including a coating layer uniformly formed on a surface of a lithium transition metal oxide.

Another aspect of the present invention provides a method of preparing a positive electrode active material in which a ratio of a compound formed in the coating layer may be controlled by adjusting a pH of an aqueous inorganic acid solution.

Another aspect of the present invention provides a positive electrode for a lithium secondary battery which includes the positive electrode active material.

Another aspect of the present invention provides a lithium secondary battery including the positive electrode for a lithium secondary battery.

Technical Solution

According to an aspect of the present invention, there is provided a positive electrode active material including: a nickel-containing lithium transition metal oxide containing nickel in an amount of 60 mol % or more based on a total number of moles of transition metals excluding lithium; and a coating layer which is formed on a surface of the nickel-containing lithium transition metal oxide and includes a lithium-containing inorganic compound, a nickel oxide, and a nickel oxyhydroxide.

According to another aspect of the present invention, there is provided a method of preparing a positive electrode active material which includes: mixing an aqueous inorganic acid solution with a nickel-containing lithium transition metal oxide containing nickel in an amount of 60 mol % or more based on a total number of moles of transition metals excluding lithium to prepare a suspension having a pH of 6 to 10; and drying the suspension and performing a low-temperature heat treatment at 200° C. to 400° C. to form a coating layer including a lithium-containing inorganic compound, a nickel oxide, and a nickel oxyhydroxide on a surface of the lithium transition metal oxide.

According to another aspect of the present invention, there is provided a positive electrode for a lithium secondary battery which includes the positive electrode active material according to the present invention.

According to another aspect of the present invention, there is provided a lithium secondary battery including the positive electrode according to the present invention.

Advantageous Effects

According to the present invention, a coating layer including a lithium-containing inorganic compound, a nickel oxide, and a nickel oxyhydroxide may be uniformly formed on a surface of a lithium transition metal oxide by performing a wet process in a suspension having a pH of 6 to 10 by mixing an inorganic acid with the lithium transition metal oxide containing a high amount of nickel. Particularly, since the nickel oxide and nickel oxyhydroxide included in the coating layer have a rock salt crystal structure with high structural stability and has lithium ion conductivity, a battery having improved charge and discharge efficiency may be provided when the lithium transition metal oxide is used in the battery.

Also, since the coating layer is uniformly formed on the surface of the lithium transition metal oxide containing a high amount of nickel, stability of a positive electrode active material may be improved while exhibiting high capacity.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

10: Positive electrode active material
11: Lithium-containing inorganic compound
12: Nickel oxide
13: Nickel oxyhydroxide
100: Positive electrode active material

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material according to the present invention includes a nickel-containing lithium transition metal oxide containing nickel in an amount of 60 mol % or more based on a total number of moles of transition metals excluding lithium; and a coating layer which is formed on a surface of the nickel-containing lithium transition metal oxide and includes a lithium-containing inorganic compound, a nickel oxide, and a nickel oxyhydroxide.

Figure 1:
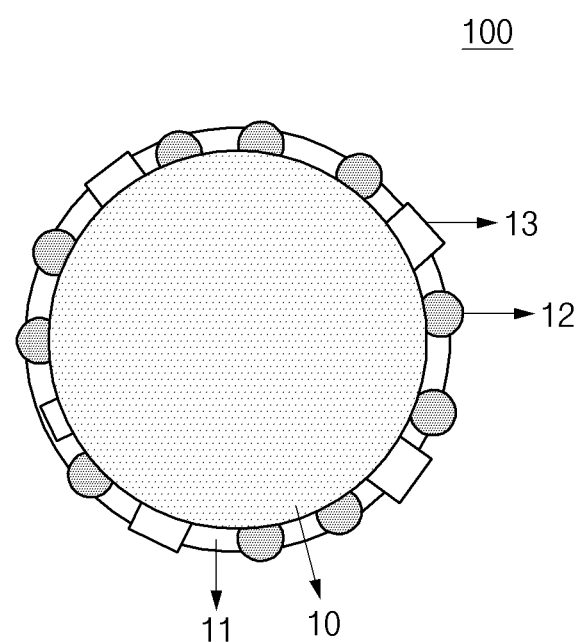
FIG. 1 is a schematic view illustrating a positive electrode active material according to the present invention.

In this regard, FIG. 1 is a schematic view illustrating the positive electrode active material according to the present invention. Referring to FIG. 1, a positive electrode active material 100 may include a nickel-containing lithium transition metal oxide 10, and a coating layer which is formed on a surface of the nickel-containing lithium transition metal oxide 10 and includes a lithium-containing inorganic compound 11, a nickel oxide 12, and a nickel oxyhydroxide 13.

Specifically, the positive electrode active material may include a nickel-containing lithium transition metal oxide containing nickel in an amount of 60 mol % or more, for example, 60 mol % to 99 mol % based on the total number of moles of transition metals excluding lithium. In a case in which the high amount of nickel is included as described above, capacity characteristics of a battery may be improved when the positive electrode active material is used in the battery.

The nickel-containing lithium transition metal oxide may be further doped with doping element $M^1$. For example, in a case in which the lithium transition metal oxide is further doped with metallic element $M^1$, structural stability of the lithium transition metal oxide may be secured, and, accordingly, life characteristics may be improved.

For example, the doping element $M^1$ may be at least one selected from the group consisting of zirconium (Zr), boron (B), aluminum (Al), cobalt (Co), tungsten (W), magnesium (Mg), cerium (Ce), tantalum (Ta), titanium (Ti), strontium (Sr), barium (Ba), hafnium (Hf), fluorine (F), phosphorus (P), sulfur (S), lanthanum (La), and yttrium (Y), and may preferably include S or Zr.

The nickel-containing lithium transition metal oxide may be more preferably represented by Formula 1 below:

$$Li_{1+a}(Ni_bCo_cX_dM^1_e)_{1-a}O_2 \qquad [\text{Formula 1}]$$

in Formula 1, X is at least one selected from the group consisting of manganese (Mn) and Al, $M^1$ is at least one selected from the group consisting of Zr, B, Al, Co, W, Mg, Ce, Ta, Ti, Sr, Ba, Hf, F, P, S, La, and Y, $0 \leq a \leq 0.1$, $0.6 \leq b \leq 1.0$, $0 \leq c \leq 0.3$, $0 \leq d \leq 0.3$, and $0 \leq e \leq 0.1$.

The nickel-containing lithium transition metal oxide may preferably be at least one selected from the group consisting of $Li_xNi_{0.8}Co_{0.1}Mn_{0.1}O_2$ ($1.0 \leq x \leq 1.10$), $Li_xNi_{0.6}Co_{0.2}Mn_{0.2}O_2$ ($1.0 \leq x \leq 1.10$), $Li_xNi_{0.87}Co_{0.07}Mn_{0.06}O_2$ ($1.0 \leq x \leq 1.10$), $Li_xNi_{0.9}Co_{0.05}Mn_{0.05}O_2$ ($1.0 \leq x \leq 1.10$), $Li_xNi_{0.8}Co_{0.1}Mn_{0.1}Al_{0.05}O_2$ ($1.0 \leq x \leq 1.10$), $Li_xNi_{0.6}Co_{0.2}Mn_{0.2}Al_{0.05}O_2$ ($1.0 \leq x \leq 1.10$), $Li_xNi_{0.87}Co_{0.07}Mn_{0.06}Al_{0.03}O_2$ ($1.0 \leq x \leq 1.10$), $Li_xNi_{0.9}Co_{0.05}Mn_{0.05}Al_{0.03}O_2$ ($1.0 \leq x \leq 1.10$), and $Li_xNi_{0.95}Co_{0.03}Mn_{0.02}Al_{0.02}O_2$ ($1.0 \leq x \leq 1.10$).

Also, the positive electrode active material includes a coating layer which is formed on a surface of the nickel-containing lithium transition metal oxide and includes a lithium-containing inorganic compound, a nickel oxide, and a nickel oxyhydroxide.

Specifically, the lithium-containing inorganic compound may be at least one selected from the group consisting of $Li_3BO_3$, $Li_3PO_4$, $LiPO_3$, $LiP_2O_7$, $\alpha$-$Li_4B_2O_5$, $\beta$-$Li_4B_2O_5$, $Li_6B_4O_9$, $\alpha$-$LiBO_2$, $Li_2B_4O_7$, $Li_3B_7O_{12}$, $LiB_3O_5$, and $Li_2B_8O_{13}$. Since the lithium-containing inorganic compound is formed on the surface of the lithium transition metal oxide as described above, mobility of lithium ions may be improved, and, accordingly, electrical conductivity of the positive electrode active material may be improved to improve charge and discharge efficiency of a battery in which the positive electrode active material is used. Particularly, in a case in which the lithium-containing inorganic compound includes $Li_3BO_3$ having excellent ionic conductivity, since resistance of the positive electrode active material including $Li_3BO_3$ is reduced, the charge and discharge efficiency and life characteristics of may be improved. The $Li_3BO_3$ is not easily synthesized by a solid-phase process, but may be synthesized only by a wet process.

The coating layer may include a nickel oxide and a nickel oxyhydroxide which are distributed in the lithium-containing inorganic compound. For example, a coating layer including a lithium-containing inorganic compound, a nickel oxide, and a nickel oxyhydroxide may be formed as a single layer on the surface of the nickel-containing lithium transition metal oxide or may be formed as a double layer in which a layer of the lithium-containing inorganic compound is formed on the surface of the nickel-containing lithium transition metal oxide and a layer of the nickel oxide and the nickel oxyhydroxide is formed on a surface of the layer of the lithium-containing inorganic compound.

In this case, the nickel oxide and the nickel oxyhydroxide have a rock salt crystal structure. The expression "rock salt crystal structure" denotes a face centered cubic structure in which a metal atom is coordinated by six oxygen atoms arranged in an octahedron around it. A compound having the rock salt crystal structure has high structural stability and lithium ion conductivity.

Since the coating layer includes the nickel oxide and nickel oxyhydroxide with a rock salt crystal structure having high structural stability, surface stability and structural stability of the positive electrode active material may be secured and the life characteristics may be improved by preventing a side reaction with an electrolyte solution when used in the battery.

The coating layer may include the lithium-containing inorganic compound and a nickel compound including the nickel oxide and nickel oxyhydroxide in a weight ratio of 10:90 to 90:10 based on a total weight of the coating layer, and may preferably include the lithium-containing inorganic compound in an amount greater than that of the nickel compound. In this case, the surface stability of the positive electrode active material may be improved due to the formation of the rock-salt structured compound having high structural stability. In contrast, in a case in which the nickel compound is included in an amount greater than that of the lithium-containing inorganic compound based on a total parts by weight of the coating layer, since the amount of nickel included in the nickel-containing lithium transition metal oxide is reduced due to an increase in amount of nickel dissolved from the nickel-containing lithium transition metal oxide, the structural stability of the positive electrode active material including the coating layer is rather reduced, and, accordingly, the life characteristics may be degraded.

The coating layer may include the nickel oxide and the nickel oxyhydroxide in a weight ratio of 1:1 to 5:1. Since the coating layer includes the nickel oxide and the nickel oxyhydroxide in a weight ratio of 1:1 to 5:1, for example, 1:1 to 3:1, the surface stability of the positive electrode active material may be secured, and thus, the life characteristics of the secondary battery, in which the coating layer is used, may be improved.

With respect to the positive electrode active material, peaks may respectively appear in binding energy ranges of 60 eV to 80 eV and 110 eV to 120 eV in spectrum measured by X-ray photoelectron spectroscopy (XPS). Since the nickel oxide and nickel oxyhydroxide included in the coating layer exhibit XPS peaks in the above ranges, it may be confirmed that the nickel oxide and the nickel oxyhydroxide are formed on the surface.

The coating layer may be uniformly formed across the entire surface of the lithium transition metal oxide.

The coating layer may be formed to a thickness of 1 nm to 500 nm, preferably 1 nm to 100 nm, and most preferably nm to 20 nm, and, in a case in which the thickness satisfies the above range, since the occurrence of the side reaction is suppressed by blocking a contact between the positive electrode active material and the electrolyte solution, the life characteristics may be improved.

Also, the present invention provides a method of preparing a positive electrode active material which includes: mixing an aqueous inorganic acid solution with a nickel-containing lithium transition metal oxide containing nickel in an amount of 60 mol % or more based on a total number of moles of transition metals excluding lithium to prepare a suspension having a pH of 6 to 10; and drying the suspension and performing a low-temperature heat treatment at 200° C. to 400° C. to form a coating layer including a lithium-containing inorganic compound, a nickel oxide, and a nickel oxyhydroxide on a surface of the lithium transition metal oxide.

First, a suspension having a pH of 6 to 10, for example, 7 to 9 is prepared by mixing an aqueous inorganic acid solution with a nickel-containing lithium transition metal oxide containing nickel in an amount of 60 mol % or more, for example, 60 mol % to 99 mol % based on a total number of moles of transition metals excluding lithium.

Any compound, which exhibits high capacity characteristics by including nickel in an amount of 60 mol % or more, may be used as the nickel-containing lithium transition metal oxide without limitation, but the nickel-containing lithium transition metal oxide may preferably be represented by Formula 1 below:

$$Li_{1+a}(Ni_bCo_cX_dM^1_e)_{1-a}O_2 \quad \text{[Formula 1]}$$

in Formula 1, X is at least one selected from the group consisting of Mn and Al, $M^1$ is at least one selected from the group consisting of Zr, B, Al, Co, W, Mg, Ce, Ta, Ti, Sr, Ba, Hf, F, P, S, La, and Y, $0 \leq a \leq 0.1$, $0.6 \leq b \leq 1.0$, 1.0, $0 \leq c \leq 0.3$, $0 \leq d \leq 0.3$, and $0 \leq e \leq 0.1$.

Specifically, in a case in which the aqueous inorganic acid solution is mixed with the nickel-containing lithium transition metal oxide, transition metals present in the surface of the nickel-containing lithium transition metal oxide, particularly, lithium ions and nickel ions may be dissociated into the aqueous inorganic acid solution by acidity of the aqueous inorganic acid solution.

For example, acidity of the suspension may be controlled by a concentration of inorganic acid included in the aqueous inorganic acid solution, an amount of residual lithium on the surface of the nickel-containing lithium transition metal oxide added to the suspension, or a mixing amount of the aqueous inorganic acid solution and the nickel-containing lithium transition metal oxide, for example, amounts of the lithium ions and the nickel ions of the nickel-containing lithium transition metal oxide, which are dissociated into the aqueous inorganic acid solution, may be controlled by adjusting the acidity of the aqueous inorganic acid solution.

The aqueous inorganic solution may have a pH of 1 to 6.

The suspension may have a pH of 6 to 10, for example, a pH of 7 to 9. For example, the higher the acidity of the suspension is, the higher the acidity of the aqueous inorganic acid solution is, and, accordingly, an amount of nickel ions dissociated into the suspension may be increased. In a case in which the pH of the suspension is outside the above range and greater than 10, the amount of the nickel ions dissociated into the suspension may be reduced, and, in a case in which the pH of the suspension is less than 6, strong acidity may cause damage to the surface of the nickel-containing lithium transition metal oxide.

In this case, the lithium ions dissociated in the suspension and the inorganic acid included in the suspension may undergo an acid-base reaction to form a lithium-containing inorganic compound on the surface of the nickel-containing lithium transition metal oxide. For example, the lithium-containing inorganic compound may be formed by the following reaction.

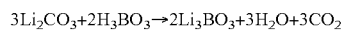

$$3Li_2CO_3 + 2H_3BO_3 \rightarrow 2Li_3BO_3 + 3H_2O + 3CO_2$$

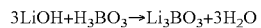

$$3LiOH + H_3BO_3 \rightarrow Li_3BO_3 + 3H_2O$$

The aqueous inorganic acid solution may include at least one selected from the group consisting of boric acid ($H_3BO_3$), phosphoric acid ($P_2O_5$, $H_3PO_4$), hydrochloric acid (HCl), sulfuric acid ($H_2SO_4$), nitric acid ($HNO_3$), carbonic acid ($H_2CO_3$), hydrofluoric acid (HF), and hydrobromic acid (HBr).

Finally, the suspension is dried in an oven at 100° C. to 200° C. for 10 hours to 15 hours and is subjected to a low-temperature heat treatment at 200° C. to 400° C., for example, 260° C. to 350° C. to form a coating layer including a lithium-containing inorganic compound, a nickel oxide, and a nickel oxyhydroxide on the surface of the nickel-containing lithium transition metal oxide.

Specifically, the nickel ions dissociated in the suspension may be respectively bonded to oxygen and hydrogen included in the aqueous inorganic acid solution during the drying to form the nickel oxide and the nickel oxyhydroxide on the surface of the nickel-containing lithium transition metal oxide. The nickel oxide and the nickel oxyhydroxide are uniformly distributed in the layer of the lithium-containing inorganic compound, and, finally, the coating layer including the lithium-containing inorganic compound, the nickel oxide, and the nickel oxyhydroxide may be formed on the surface of the positive electrode active material.

For example, in a case in which the nickel-containing lithium transition metal oxide contains nickel in an amount of less than 60 mol % based on the total number of moles of transition metals excluding lithium, since the amounts of the nickel and the residual lithium on the surface are reduced due to a reduction in the amount of the nickel included in the lithium transition metal oxide, the dissociation of nickel ions and lithium ions, particularly, the nickel ions into the aqueous inorganic acid solution does not occur even if the lithium transition metal oxide and the aqueous inorganic acid solution are mixed, and thus, the formation of the coating layer including the lithium-containing inorganic compound, the nickel oxide, and the nickel oxyhydroxide on the surface of the lithium transition metal oxide is not easy.

In a case in which the suspension is filtered and then dried when the suspension is dried, the nickel oxide and nickel oxyhydroxide formed on the surface of the lithium transition metal oxide may be removed by the filtering. However, in a case in which the suspension is dried using the oven without filtering as in the present invention, the nickel oxide and the nickel oxyhydroxide may be retained on the surface of the positive electrode active material.

In addition, a residual solution (water) contained in the suspension may be removed by performing a low-temperature heat treatment at 200° C. to 400° C. after drying the suspension, and the lithium-containing inorganic compound, the nickel oxide, and the nickel oxyhydroxide may be cured on the surface of the lithium transition metal oxide by the above heat treatment to be formed as a coating layer. In a case in which the heat treatment is performed at a temperature above the range, the nickel oxyhydroxide included in the coating layer may be converted into the nickel oxide, and, in this case, since the surface stability of the positive electrode active material may not be secured, the life characteristics may be consequently degraded.

The coating layer may have a thickness of 1 nm to 500 nm, preferably 1 nm to 100 nm, and most preferably 3 nm to 20 nm, and may be uniformly formed across the entire surface of the lithium transition metal oxide.

Also, provided is a positive electrode for a lithium secondary battery including the positive electrode active material according to the present invention. Specifically, provided is the positive electrode for a lithium secondary battery which includes a positive electrode collector and a positive electrode active material layer formed on the positive electrode collector, wherein the positive electrode active material layer includes the positive electrode active material according to the present invention.

In this case, since the positive electrode active material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a binder as well as a conductive agent, if necessary, in addition to the above-described positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

A suspension having a pH of 9 was prepared by mixing 300 g of $LiNi_{0.8}Co_{0.1}Mn_{0.1}O_2$ and 100 mL of $H_3BO_3$ having a pH of 4 and then subjected to a reaction for 0.5 hrs. The suspension thus obtained was dried in an oven at 150° C. for 12 hours and then heat-treated at 280° C. to prepare a positive electrode active material in which a 5 nm thick coating layer, which includes a Li—B—O compound including $Li_3BO_3$, $Li_2B_4O_7$, $Li_3B_7O_{12}$, and $LiB_3O_5$, NiO, and NiOOH, was formed on a surface of the lithium transition metal oxide. In this case, a weight ratio of the NiO to the NiOOH, which were included in the formed coating layer, was 2:1.

The above-prepared positive electrode active material, a carbon black conductive agent, and a PVdF binder were mixed in a weight ratio of 95:2.5:2.5 in an N-methylpyrrolidone solvent to prepare a composition for forming a positive electrode. A 20 µm thick Al current collector was coated with the composition for forming a positive electrode, dried, and then roll-pressed to prepare a positive electrode.

Lithium metal was used as a counter electrode.

After the above-prepared positive electrode and the lithium metal were stacked with a separator (Celgard, LLC) to prepare an electrode assembly, the electrode assembly was put in a battery case, and an electrolyte solution, in which 1 M $LiPF_6$ was dissolved in a mixed solvent in which ethylene carbonate (EC):ethyl methyl carbonate (EMC):diethyl carbonate (DEC) were mixed in a volume ratio of 40:30:30, was injected thereinto to prepare a lithium secondary battery.

Example 2

A positive electrode and a lithium secondary battery including the same were prepared in the same manner as in Example 1 except that 300 g of $LiNi_{0.2}Co_{0.1}Mn_{0.1}O_2$ and 100 mL of $H_3PO_4$ having a pH of 2 were mixed, a suspension having a pH of 7 was used to form a coating layer including $Li_3PO_4$, $LiPO_2$, NiO, and NiOOH, and a positive electrode active material was used in which a weight ratio of the NiO to the NiOOH, which were included in the coating layer, was 5:1.

Example 3

A positive electrode and a lithium secondary battery including the same were prepared in the same manner as in Example 1 except that 300 g of $LiNi_{0.2}Co_{0.1}Mn_{0.1}O_2$ and 150 mL of a $H_3BO_3$ aqueous solution having a pH of 6 were mixed, a suspension having a pH of 10 was used, and a positive electrode active material was used in which a weight ratio of NiO to NiOOH, which were included in a coating layer, was 1:1.

Comparative Example 1

$LiNi_{0.2}Co_{0.1}Mn_{0.1}(OH)_2$ and LiOH were mixed in a weight ratio of 1:1.03 and then sintered at 800° C. to prepare $LiNi_{0.2}Co_{0.1}Mn_{0.1}O_2$. The $LiNi_{0.2}Co_{0.1}Mn_{0.1}O_2$ was washed using distilled water at 25° C. or less. The washed $LiNi_{0.2}Co_{0.1}Mn_{0.1}O_2$ and $H_3BO_3$ were dry mixed in a weight ratio of 1:0.01 using an FM mixer and then heat-treated at 280° C. to prepare a positive electrode active material in which a Li—B—O compound including $LiBO_2$ and $Li_2B_4O_7$ on the surface thereof was non-uniformly formed on the surface of the $LiNi_{0.8}Co_{0.1}Mn_{0.1}O_2$. A positive electrode and a lithium secondary battery including the same were prepared in the same manner as in Example 1 except that the above-prepared positive electrode active material was used.

Comparative Example 2

A positive electrode and a lithium secondary battery including the same were prepared in the same manner as in Example 1 except that a positive electrode active material was used in which a coating layer including $B_2O_3$, $LiBO_2$, $Li_2B_4O_7$, and NiO was formed on the surface of a lithium transition metal oxide by heat-treating a suspension, in which the lithium transition metal oxide and an aqueous inorganic acid solution were mixed, at 500° C. during the heat treatment after drying the suspension.

Comparative Example 3

A positive electrode and a lithium secondary battery including the same were prepared in the same manner as in Example 1 except that a positive electrode active material was used in which a coating layer including $LiBO_2$, $Li_3BO_3$, and $Li_2B_4O_7$ was formed on the surface of a lithium transition metal oxide by filtering a suspension, in which the lithium transition metal oxide and an aqueous inorganic acid solution were mixed, using a pressure-reducing filter during drying the suspension and then performing a heat treatment.

Experimental Example 1: Identification of Surface Characteristics of Positive Electrode Active Material Surface characteristics of the surface of the positive electrode active material prepared in Example 1 were identified using a transmission electron microscope (TEM), and the surface characteristics are presented in FIG. 2.

Figure 2:
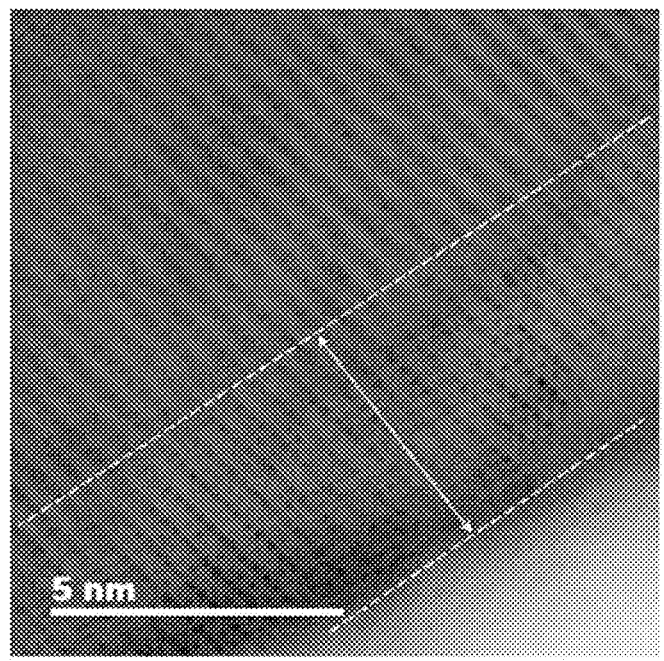
FIG. 2 is a transmission electron microscope (TEM) image of a positive electrode active material prepared in Example 1.

As shown in a portion indicated by the dotted line in FIG. 2, with respect to the positive electrode active material prepared in Example 1, crystals of the positive electrode active material were not formed into a layered structure, but were formed into a rock salt structure.

Figure 3:
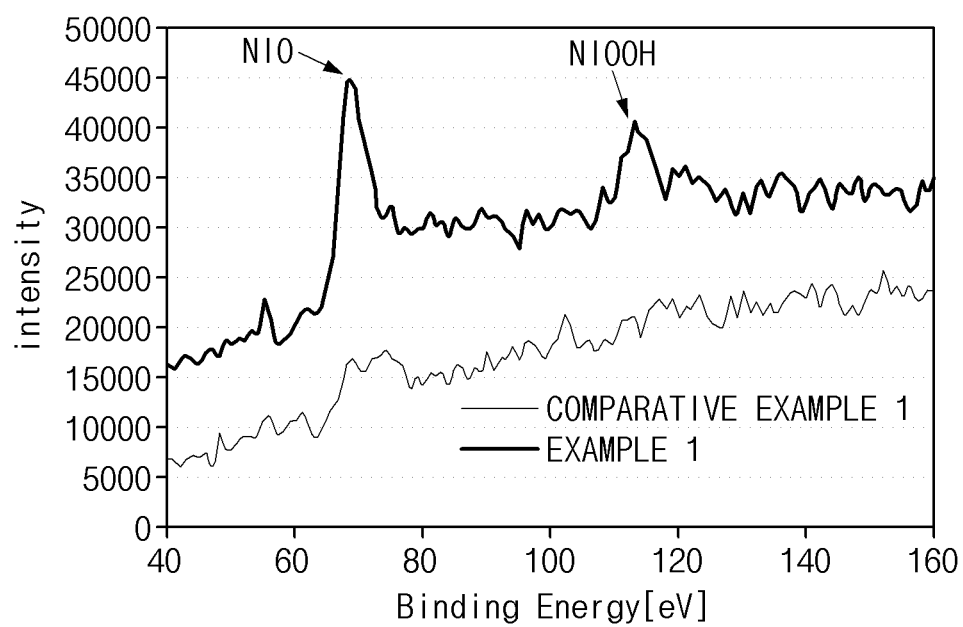
FIG. 3 is a graph illustrating X-ray photoelectron spectroscopy (XPS) spectrum of positive electrode active materials prepared in Example 1 and Comparative Example 1.

Experimental Example 2: X-Ray Photoelectron Spectroscopy (XPS) of Coating Layer With respect to the positive electrode active materials prepared in Example 1 and Comparative Example 1, coating layers respectively included in the positive electrode active materials were evaluated by X-ray photoelectron spectroscopy using a Thermo Scientific spectrometer (K-alpha corp.), and the results of the XPS analysis are presented in FIG. 3.

From the experimental results, with respect to the positive electrode active material prepared in Example 1, it may be confirmed that a peak of nickel oxide was appeared at 66.8 eV and a peak of nickel oxyhydroxide was appeared at 113.02 eV.

However, with respect to the positive electrode active material prepared in Comparative Example 1, since the washing process was performed, it may be confirmed that a NiO peak was partially formed. However, with respect to the positive electrode active material prepared in Comparative Example 1, since the strength of the NiO peak formed was significantly low, an effect of improving stability of the positive electrode active material was not significant. It was confirmed that a peak of nickel oxyhydroxide was not appeared in the positive electrode active material prepared in Comparative Example 1.

Experimental Example 3: Life Characteristics Evaluation

Life characteristics were measured for each of the lithium secondary batteries prepared in Examples 1 to 3 and Comparative Examples 1 to 3.

Figure 4:
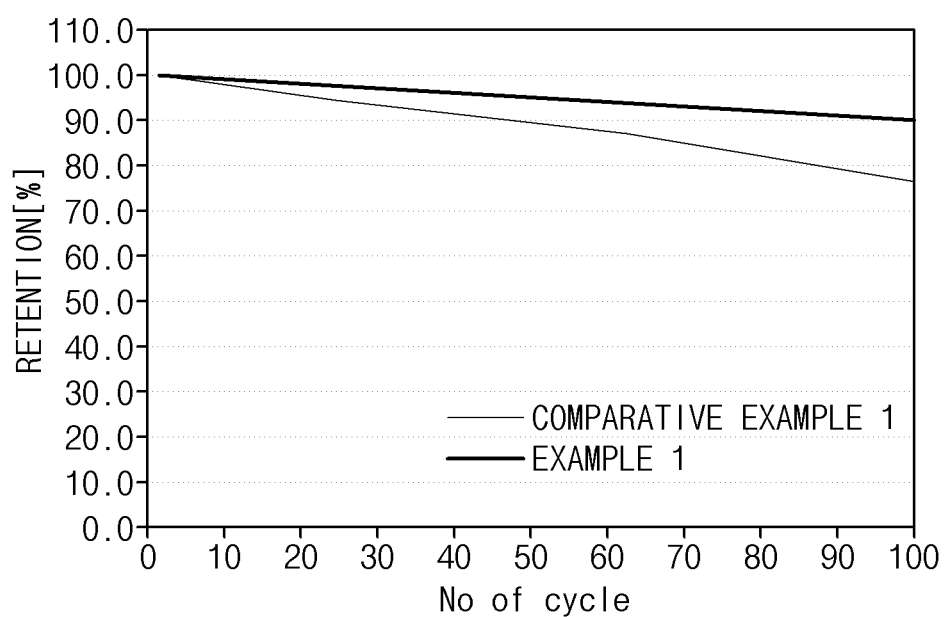
FIG. 4 is a graph illustrating life retentions of the positive electrode active materials prepared in Example 1 and Comparative Example 1 according to cycles.

Specifically, each of the secondary batteries prepared in Examples 1 to 3 and Comparative Examples 1 to 3 was charged at a constant current of 1 C to 4.4 V at 25° C. and cut-off charged at 0.05 C. Thereafter, each secondary battery was discharged at a constant current of 1 C to a voltage of 3 V. The charging and discharging behaviors were set as one cycle, and, after this cycle was repeated 100 times, capacity retentions of the lithium secondary batteries according to Examples 1 to 3 and Comparative Examples 1 to 3 were measured, and the results thereof are presented in FIG. 4 and Table 1 below.

TABLE 1

|  | Capacity retention in the 100$^{th}$ cycle (%) |
| --- | --- |
| Example 1 | 90 |
| Example 2 | 82 |
| Example 3 | 85 |
| Comparative Example 1 | 84 |
| Comparative Example 2 | 81 |
| Comparative Example 3 | 75 |

With respect to the secondary batteries prepared in Examples 1 and 3, capacity retentions in the 100th cycle were respectively 90% and 85%, wherein it may be confirmed that the capacity retentions were better than those of the secondary batteries prepared in Comparative Examples 1 to 3. With respect to the secondary battery prepared in Example 2, since the acidity of the aqueous inorganic acid solution was too strong, defects were formed on the surface of the positive electrode active material, and thus, it may be confirmed that the life characteristics were somewhat degraded.

The invention claimed is:

1. A positive electrode active material comprising:
   a nickel-containing lithium transition metal oxide containing nickel in an amount of 60 mol % or more based on a total number of moles of transition metals excluding lithium; and
   a coating layer which is formed on a surface of the nickel-containing lithium transition metal oxide wherein the coating layer includes a lithium-containing inorganic compound, a nickel oxide, and a nickel oxyhydroxide.

2. The positive electrode active material of claim 1, wherein the nickel oxide and the nickel oxyhydroxide have a rock salt crystal structure.

3. The positive electrode active material of claim 1, wherein the coating layer comprises the nickel oxide and the nickel oxyhydroxide in a weight ratio of 1:1 to 5:1.

4. The positive electrode active material of claim 1, wherein peaks respectively appear in binding energy ranges of 60 eV to 80 eV and 110 eV to 120 eV in a spectrum of the positive electrode active material measured by X-ray photoelectron spectroscopy.

5. The positive electrode active material of claim 1, wherein the lithium-containing inorganic compound comprises $Li_3BO_3$, $Li_3PO_4$, $LiPO_3$, $LiP_2O_7$, $\alpha\text{-}Li_4B_2O_5$, $\beta\text{-}Li_4B_2O_5$, $Li_6B_4O_9$, $\alpha\text{-}LiBO_2$, $Li_2B_4O_7$, $Li_3B_7O_{12}$, $LiB_3O_5$, or $Li_2B_8O_{13}$.

6. The positive electrode active material of claim 1, wherein the nickel-containing lithium transition metal oxide is represented by Formula 1:

$$Li_{1+a}(Ni_bCo_cX_dM^1_e)_{1-a}O_2 \quad \text{[Formula 1]}$$

wherein,
X is at least one selected from the group consisting of manganese (Mn) and aluminum (Al),
$M^1$ is at least one selected from the group consisting of zirconium (Zr), boron (B), Al, cobalt (Co), tungsten (W), magnesium (Mg), cerium (Ce), tantalum (Ta), titanium (Ti), strontium (Sr), barium (Ba), hafnium (Hf), fluorine (F), phosphorus (P), sulfur (S), lanthanum (La), and yttrium (Y), and
$0 \leq a \leq 0.1$, $0.6 \leq b \leq 1.0$, $0 \leq c \leq 0.3$, $0 \leq d \leq 0.3$, and $0 \leq e \leq 0.1$.

7. The positive electrode active material of claim 1, wherein the amount of the nickel-containing lithium transition metal oxide containing nickel is from 60 mol % to 99 mol % based on a total number of moles of transition metals excluding lithium.

8. A positive electrode for a lithium secondary battery, the positive electrode comprising the positive electrode active material of claim 1.

9. A lithium secondary battery comprising the positive electrode of claim 8.

10. A method of preparing a positive electrode active material, comprising:
    mixing an aqueous inorganic acid solution with a nickel-containing lithium transition metal oxide containing nickel in an amount of 60 mol % or more based on a total number of moles of transition metals excluding lithium to prepare a suspension having a pH of 6 to 10; and
    drying the suspension and performing a low-temperature heat treatment at 200° C. to 400° C. to form a coating layer including a lithium-containing inorganic compound, a nickel oxide, and a nickel oxyhydroxide on a surface of the lithium transition metal oxide.

11. The method of claim 10, wherein lithium ions and nickel ions, which are included in the nickel-containing lithium transition metal oxide, are dissociated into the aqueous inorganic acid solution by the mixing.

12. The method of claim 11, wherein a lithium-containing inorganic compound is formed by an acid-base reaction of inorganic acid included in the aqueous inorganic acid solution with the lithium ions dissociated in the aqueous inorganic acid solution.

13. The method of claim 11, wherein the nickel ions dissociated in the aqueous inorganic acid solution and oxygen or hydrogen included in the aqueous inorganic acid solution react to form a nickel oxide and a nickel oxyhydroxide.

14. The method of claim 10, wherein the aqueous inorganic acid solution has a pH of 1 to 6.

15. The method of claim 10, wherein the aqueous inorganic acid solution comprises boric acid, phosphoric acid, hydrochloric acid, sulfuric acid, nitric acid, carbonic acid, hydrofluoric acid, or hydrobromic acid.

16. The method of claim 10, wherein the amount of the nickel-containing lithium transition metal oxide containing nickel is from 60 mol % to 99 mol % based on a total number of moles of transitional metals excluding lithium.

\* \* \* \* \*